(12) United States Patent
Kreher

(10) Patent No.: US 11,041,527 B2
(45) Date of Patent: Jun. 22, 2021

(54) ACTIVE RADIAL MAGNETIC BEARING WITH YOKE WINDING

(71) Applicant: maxon international ag, Sachseln (CH)

(72) Inventor: Johannes Kreher, Obwalden (CH)

(73) Assignee: MAXON INTERNATIONAL AG, Sachseln (CH)

(*) Notice: Subject to any disclaimer, the term of this patent is extended or adjusted under 35 U.S.C. 154(b) by 11 days.

(21) Appl. No.: 16/119,122

(22) Filed: Aug. 31, 2018

(65) Prior Publication Data
US 2019/0072130 A1 Mar. 7, 2019

(30) Foreign Application Priority Data
Sep. 5, 2017 (EP) ..................................... 17189437

(51) Int. Cl.
*F16C 32/04* (2006.01)
*H02K 7/09* (2006.01)

(52) U.S. Cl.
CPC ........ *F16C 32/048* (2013.01); *F16C 32/0461* (2013.01); *F16C 32/0465* (2013.01)

(58) Field of Classification Search
CPC ................ F16C 32/048; F16C 32/0465; F16C 32/0461; H02K 7/09
(Continued)

(56) References Cited

U.S. PATENT DOCUMENTS 3,877,761 A * 4/1975 Boden ................. F16C 32/0474
310/90.5

3,988,658 A * 10/1976 Meinke ............... F16C 32/0444
318/647
(Continued)

FOREIGN PATENT DOCUMENTS

CN 102042327 A 5/2011
CN 103329400 A 9/2013
(Continued)

OTHER PUBLICATIONS

X. Yanliang et al.,"Analysis of Hybrid Magnetic Bearing with a Permanent Magnet in the Rotor by FEM", IEEE Transactions on Magnetics, vol. 42, No. 4, Apr. 2006. (Year: 2006).*
(Continued)

*Primary Examiner* — Burton S Mullins
(74) *Attorney, Agent, or Firm* — Buchanan Ingersoll & Rooney PC

(57) ABSTRACT

A radial magnetic bearing includes an axis, a stator and a rotor. The stator includes at least two stator assemblies axially spaced from one another. Each stator assembly includes a magnetically soft core. At least one of the stator assemblies includes one said magnetically soft core with several radially projecting teeth arranged distributed in the circumferential direction, and several coils likewise arranged distributed in the circumferential direction. Two respective teeth of the magnetically soft core that are successive in the circumferential direction are connected to each other by a connecting section of the core. The magnetic bearing includes a permanent magnet assembly disposed axially between the two magnetically soft cores. At least one said stator assembly is embodied such that one of the respective connecting sections is wound with one of the respective coils.

13 Claims, 7 Drawing Sheets

Figure 1:
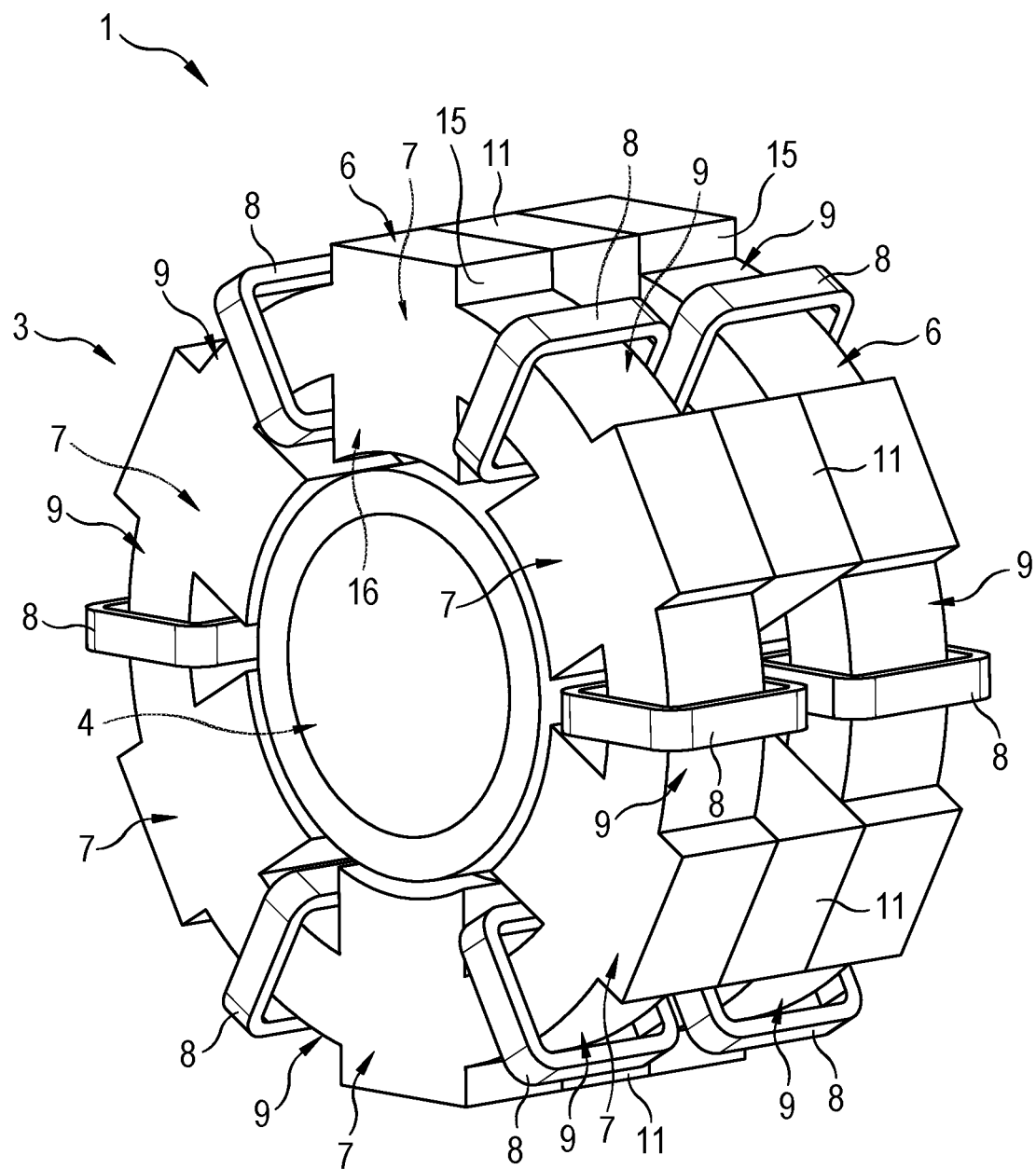

(58) Field of Classification Search
USPC .................................................. 310/90.5, 164
See application file for complete search history.

(56) References Cited

U.S. PATENT DOCUMENTS

| | | | | |
|---|---|---|---|---|
| 4,245,869 A * | 1/1981 | Scheffer | ................ | F16C 32/048 310/90.5 |
| 4,387,936 A * | 6/1983 | Ishizawa | ............. | F16C 32/0487 310/90.5 |
| 4,983,869 A * | 1/1991 | Vaidya | ................ | F16C 32/0468 310/90.5 |
| 5,111,102 A * | 5/1992 | Meeks | ................ | F16C 32/0444 310/90.5 |
| 5,962,940 A | 10/1999 | Imlach | | |
| 6,043,580 A | 3/2000 | Vogel et al. | | |
| 6,130,494 A * | 10/2000 | Schob | ................ | F16C 32/0463 310/90.5 |
| 6,181,041 B1 * | 1/2001 | Nose | ........................ | H02K 1/06 310/164 |
| 6,313,555 B1 * | 11/2001 | Blumenstock | ...... | F16C 32/0459 310/178 |
| 7,683,514 B2 | 3/2010 | Onuma et al. | | |
| 7,800,269 B2 | 9/2010 | Onuma et al. | | |
| 8,058,758 B2 * | 11/2011 | Ries | .................... | F16C 32/0414 310/90.5 |
| 8,330,312 B2 * | 12/2012 | Perner | ................ | F16C 32/0423 310/90.5 |
| 2005/0077793 A1 * | 4/2005 | Garvey | ............... | F16C 32/0444 310/90.5 |
| 2009/0079284 A1 | 3/2009 | Onuma et al. | | |
| 2009/0315421 A1 | 12/2009 | Onuma et al. | | |
| 2010/0033046 A1 * | 2/2010 | Chiba | .................. | H02K 1/2746 310/90.5 |
| 2010/0109463 A1 * | 5/2010 | Jiang | ................... | F16C 32/0487 310/90.5 |
| 2013/0270928 A1 | 10/2013 | Nord | | |
| 2014/0339941 A1 * | 11/2014 | Bott | .................... | F16C 32/0461 310/90.5 |
| 2015/0048708 A1 | 2/2015 | Nord et al. | | |
| 2015/0137642 A1 * | 5/2015 | Vande Sande | ...... | F16C 32/0461 310/90.5 |

FOREIGN PATENT DOCUMENTS

| | | | | |
|---|---|---|---|---|
| CN | 104832538 A | | 8/2015 | |
| CN | 105257699 A | | 1/2016 | |
| CN | 106678176 A | | 5/2017 | |
| CN | 107327483 A | * | 11/2017 | ............ F16C 32/047 |
| DE | 23 38 307 A1 | | 2/1975 | |
| DE | 3130974 A1 | | 2/1983 | |
| JP | S63-106916 U | | 7/1988 | |
| JP | S63-242153 A | | 10/1988 | |
| JP | H 08135670 A | | 5/1996 | |
| JP | H 11513558 A | | 11/1999 | |
| JP | 2007120635 A | | 5/2007 | |
| JP | 5043342 B2 | | 10/2012 | |
| WO | 90/14525 A1 | | 11/1990 | |
| WO | 9014525 A1 | | 11/1990 | |

OTHER PUBLICATIONS

Extended European Search Report of European Patent Application No. 17 18 9437, dated Feb. 20, 2018.

Office Action dated Nov. 28, 2019, by the Chinese Patent Office in corresponding Chinese Patent Application No. 201811027249.6, and an English Translation of the Office Action. (17 pages).

Office Action dated Nov. 19, 2019, by the Japanese Patent Office in corresponding Japanese Patent Application No. 2018-152828, and an English Translation of the Office Action. (11 pages).

* cited by examiner

ACTIVE RADIAL MAGNETIC BEARING WITH YOKE WINDING

The present invention relates to a radial magnetic bearing.

A generic radial magnetic bearing comprises an axis, a stator and a rotor. The stator and the rotor are arranged coaxially relative to each other and to the axis of the magnetic bearing. The stator comprises at least two axially spaced stator assemblies. Each of the stator assemblies comprises one said magnetically soft core, where at least one of the stator assemblies comprises one said magnetically soft core with several radially projecting teeth arranged distributed in the circumferential direction, and several coils likewise arranged distributed in the circumferential direction. Two respective teeth of the magnetically soft core that are successive in the circumferential direction are connected to each other by way of a connecting section of the core. The magnetic bearing further comprises a permanent magnet assembly disposed axially between the two magnetically soft cores.

In the radial magnetic bearings of the generic type known from prior art, the permanent magnet assembly typically consists of a single magnet ring, which is also part of the stator and is magnetized in the axial direction. This magnet ring is located directly between the two cores. The cores typically comprise an outer ring from which the teeth project radially inwardly. The connecting sections are therefore simple ring segments. In the radial magnetic bearings known from prior art, the teeth are wound with the coils. This enables various tooth, phase and winding topologies.

A radial magnetic bearing is known, for example, from WO 90/4525 A1.

The permanent magnet ring between the two cores creates a magnetic flow that is completed via the rotor. In the de-energized state, the magnetic flow is distributed evenly across the circumference, so that no net force arises in the radial direction. Energizing the coils creates a magnetic field that affects the magnetic flow of the permanent magnet. The magnetic flow is directed such that the flow density in the air gap between the rotor and the stator is no longer distributed evenly. This creates a net force acting on the rotor in the radial direction. When a single-tooth winding is used in the concept known from prior art, then the currents of the individual coils partially compensate each other, so that the concept is not very efficient and the force density is relatively low. It is also known from prior art to use a diameter winding. However, it has a very large winding head which does not contribute to force development. The force density is therefore relatively low.

The present invention is therefore based on the object of developing a radial magnetic bearing of the generic type further such that the force density is increased.

Accordingly, an inventive solution to the object is given for a radial magnetic bearing where at least one said stator assembly, comprising several coils arranged distributed in the circumferential direction and the magnetically soft core of which comprises several radially projecting teeth arranged distributed in the circumferential direction is configured such that one of the respective connecting sections is wound with one of the respective coils.

In other words, not the teeth of the core but the connecting sections of the core extending substantially in the circumferential direction between the teeth are wound with the coils. Each connecting section forms a yoke between the respective adjoining teeth, for which reason the coils can also be referred to as a yoke winding.

The solution according to the invention leads to a significantly increased force density of the radial magnetic bearing. With the same copper power loss and the same force, it is possible to increase the force density by more than 50%.

In the context of the present application, spatial details such as "axial", "radial", "in the circumferential direction" etc. refer to the axis of the magnetic bearing, unless otherwise stated.

The stator is preferably an external stator, and the rotor is an internal rotor.

Advantageous embodiments of the present invention are the subject of the dependent claims.

According to a preferred embodiment of the present invention, all of the stator assemblies are embodied such that their magnetically soft core has several radially projecting teeth arranged distributed in the circumferential direction, where two respective teeth of the magnetically soft core that are successive in the circumferential direction are connected to each other by way of a connecting section of the core, and where one respective connecting section is wound with one respective coil. As a result, a particularly high force density can be obtained.

According to a further particularly preferred embodiment of the present invention, the permanent magnet assembly is part of the stator and comprises several axially magnetized single magnets, where the single magnets are arranged such that the single magnets and the teeth are aligned with each other in the axial direction. The number of single magnets therefore corresponds to the number of teeth for every core. The single magnets are preferably arranged between the teeth of two cores, where the two cores are parts of different stator assemblies. Each permanent magnet is therefore located axially between a tooth of a first core and a tooth of a second core. This embodiment is particularly easy to manufacture and also inexpensive to manufacture, since single permanent magnets are easier to manufacture and procure than magnet rings. Particularly advantageous is the use of block-shaped magnets since they can be produced in a particularly simple manner. Further preferably, the permanent magnets and the teeth of the cores have substantially the same cross section with respect to the axis of the magnetic bearing. If the rotor is in the interior, a slight deviation between the geometry of a tooth and the geometry of the respectively associated permanent magnet on the inner circumference of the stator is quite useful since the teeth advantageously nestle against the outer circumference of the rotor, regardless of the required air gap, whereas the permanent magnets, for reasons of costs, have a simple block geometry with respectively planar side surfaces.

Instead of using several single permanent magnets, a single ring magnet can of course also be used in an alternative embodiment.

According to a further particularly preferred embodiment of the present invention, the rotor comprises an outer hollow cylindrical part and an inner part, where the outer hollow cylindrical part is embodied as a magnetically soft laminated sheet package, and where the inner part of the rotor is embodied as a solid magnetically soft circuit yoke. The rotor has the duty of absorbing the radial flow and forming the axial circuit yoke. Since eddy currents are to be expected under load on the outer circumference of the rotor and eddy currents are to be prevented as much as possible, it would generally be advantageous to configure the rotor as a magnetically soft laminated sheet package. However, this contradicts the requirement for the rotor to axially conduct the magnetic flow. The embodiment with a hollow cylindrical outer part in the form of a magnetically soft laminated sheet package and an inner solid magnetically soft circuit yoke meets both requirements. The solid magnetically soft circuit yoke of the rotor is preferably in the region of incipient saturation. As a result, the change in the magnetic flow density in the solid part of the rotor is small even under load, thereby reducing the eddy current losses in this region.

According to an alternative embodiment of the present invention, the permanent magnet assembly is part of the rotor. In this case, the permanent magnet assembly preferably comprises a continuous axially magnetized permanent magnet, which is part of the rotor assembly. This can further preferably be a cylinder or a disk. In the context of the present application, a continuous permanent magnet is understood as meaning both a single permanent magnet as well as a permanent magnet composed of several parts, the first alternative being preferred. Further preferably, the permanent magnet in this embodiment comprises a passage opening through which a shaft of the rotor or the rotor assembly, respectively, extends, so that the permanent magnet is configured to be ring-shaped. When the permanent magnet assembly is part of the rotor, the permanent magnet assembly in an axial projection does not necessarily need to overlap the magnetically soft cores of the stator assemblies in order to be arranged axially between the magnetically soft cores within the meaning of the present application. Only the respective central axial position of said components is crucial. The outer diameter of the permanent magnet assembly on the side of the rotor can be, for example, smaller than an inner diameter of the cores on the side of the stator. On the stator side, a magnetically soft flow guide between the cores of the stator assemblies can be provided in this case. The magnetically soft flow guide can comprise one or more magnetically soft blocks disposed between the cores. The magnetically soft block can consist, for example, of radially or tangentially arranged magnetically soft metal plates or of a magnetically soft composite material (SMC). A permanent magnet of the rotor module can also be provided in addition to a permanent magnet assembly of the stator.

Each of the magnetically soft cores preferably has the same number of teeth. Any number of teeth is possible. However, each magnetically soft core preferably has four or six teeth each.

According to a further embodiment of the present invention, more than two stator assemblies are provided, where one permanent magnet assembly is respectively arranged between two axially successive stator assemblies. In this embodiment, it is also possible that one of the stator assemblies comprises no coils. The magnetic bearing can have, for instance, three stator assemblies, where preferably either only the center one of the three stator assemblies or only the outer two of the three stator assemblies have coils. The magnetically soft core of the unwound stator assembly can either also be configured to be toothed or ring-shaped.

It is also conceivable that the magnetic bearing according to the invention at both axial ends terminates with a respective permanent magnet assembly. The magnetic flow in this case is completed at the two axial ends via the air or via adjacent components.

According to a further preferred embodiment of the present invention, the connecting sections of the cores of the stator assemblies are each configured as ring segments. The ring segments can basically have any arbitrary radius of curvature. The radius of curvature is preferably greater than the radial distance of the ring segment to the axis of the magnetic bearing. Alternatively, the connecting sections can also be configured such that they extend substantially rectilinear and, with respect to the axis, in the tangential direction.

According to a further particularly preferred embodiment of the present invention, the teeth project both radially outwardly as well as radially inwardly. The connecting sections together with center portions of the teeth therefore form a continuous ring from which the teeth respectively project radially inwardly and radially outwardly. With suitable size ratios, the grooves existing between the teeth can also be closed on the outer or inner circumference of the core.

According to a further particularly preferred embodiment of the present invention, the permanent magnet or the permanent magnets is/are configured as a rare earth magnet. This results in a particularly lightweight and compact design.

According to a further embodiment of the present invention, the magnetically soft core consists of a laminated sheet package. However, the magnetically soft core can also consist of magnetically soft composite material.

Inexpensive production is given in particular where the coils are wound onto the connecting sections by way of a toroidal winding machine.

Embodiments of the present invention are explained in more detail below with reference to drawings, where FIG. 1: shows an oblique view of a radial magnetic bearing according to a first embodiment, FIG. 2: shows a longitudinal sectional view of the radial magnetic bearing of FIG. 1 along section line II shown in FIG. 3, FIG. 3: shows a cross sectional view through the radial magnetic bearing of FIGS. 1 and 2 along section line III shown in FIG. 2, FIG. 4: shows a longitudinal sectional view through a radial magnetic bearing according to a second embodiment, FIG. 5: shows a longitudinal sectional view through a radial magnetic bearing according to a third embodiment, FIG. 6: shows a longitudinal sectional view through a radial magnetic bearing according to a fourth embodiment, and FIG. 7: shows a longitudinal sectional view through a radial magnetic bearing according to a fifth embodiment.

It applies to the following embodiments that like parts are designated by like reference numerals. Where a figure contains reference numerals which are not explained in more detail in the associated figure description, then reference is made to preceding or subsequent figure descriptions.

Figure 2:
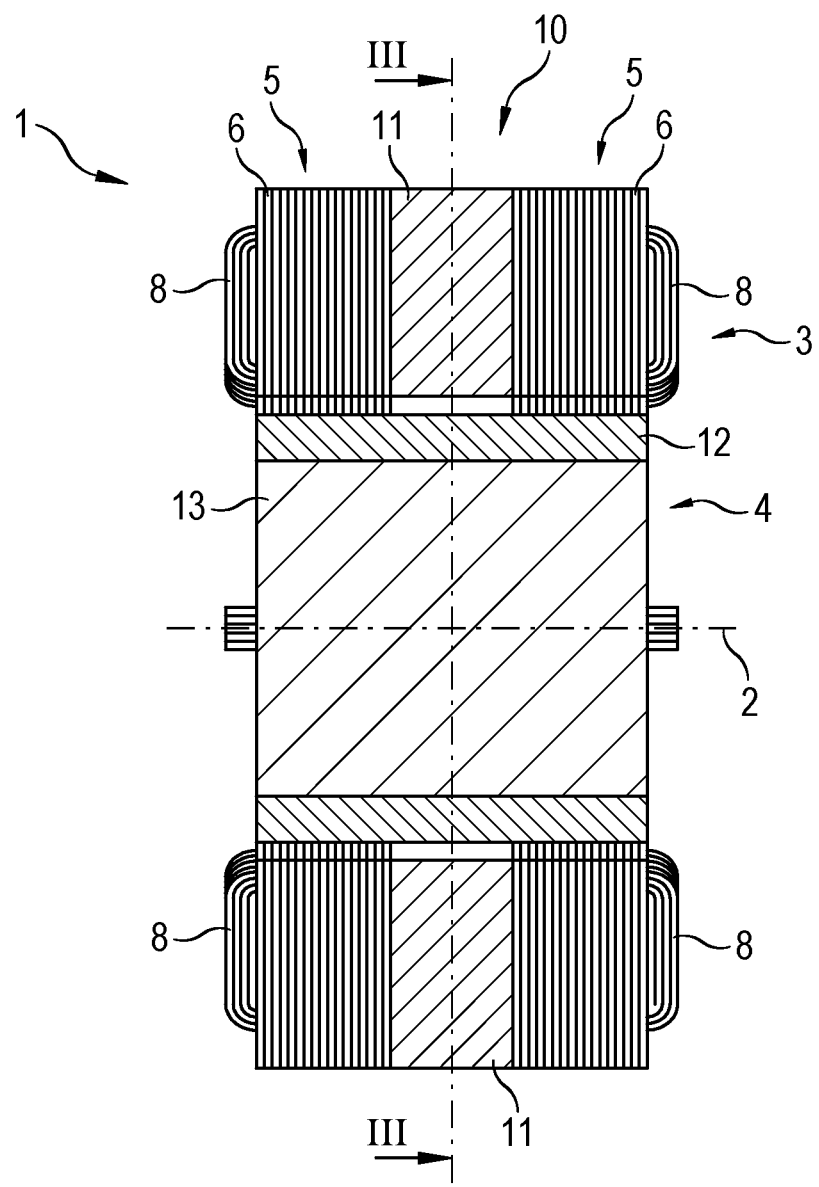
Figure 3:
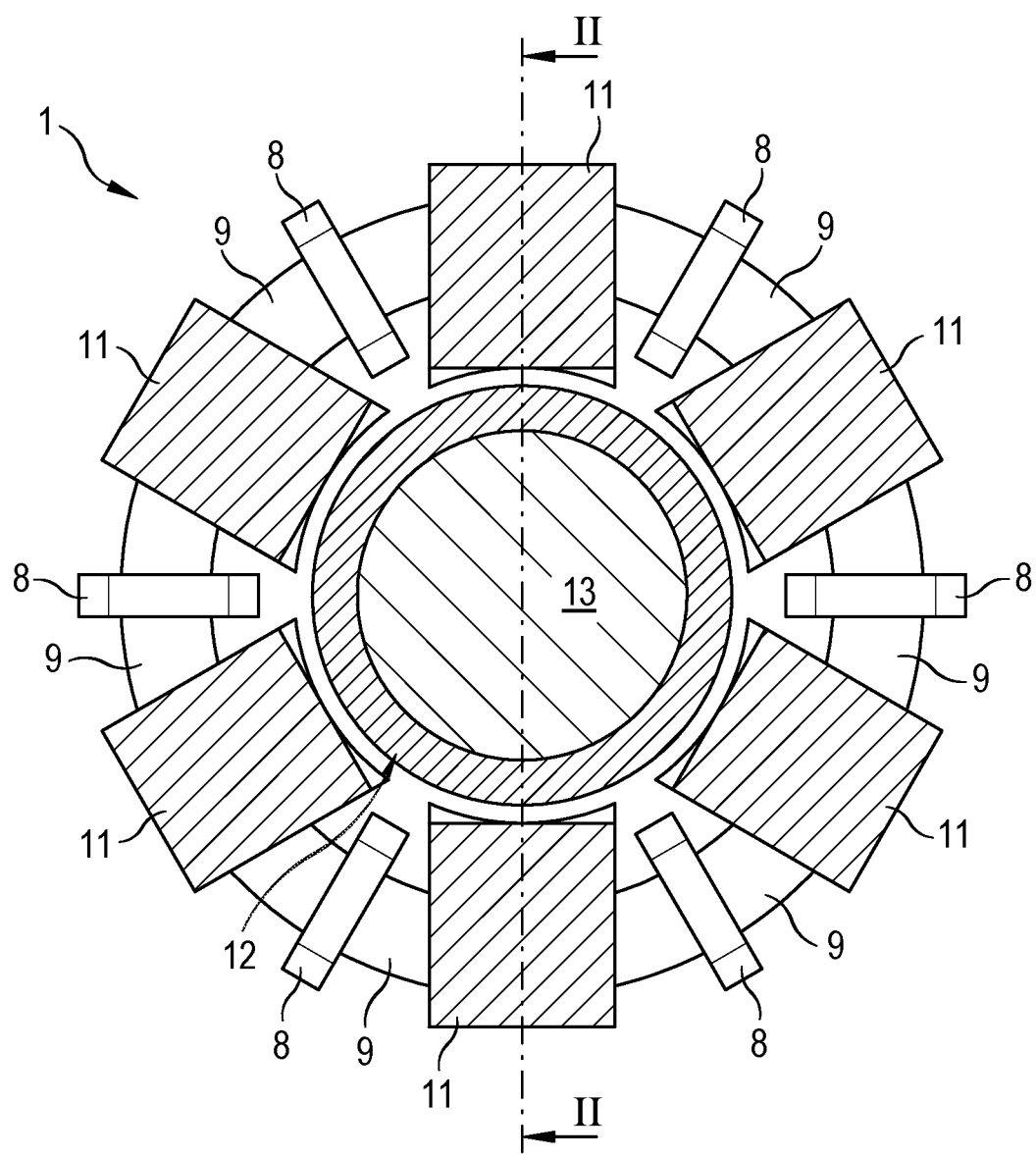

FIGS. 1 to 3 show a first embodiment of a radial magnetic bearing 1 according to the invention. The magnetic bearing comprises an outer stator 3 and an inner rotor 4. Stator 3 and rotor 4 are arranged coaxially to each other. They are therefore both configured to be substantially rotationally symmetrical to a common axis 2 of the magnetic bearing.

As shown in particular in FIG. 2, stator 3 comprises two stator assemblies 5 which are axially spaced apart from one another. Each of the two stator assemblies 5 comprises a magnetically soft core 6. The magnetically soft cores are each configured as a magnetically soft laminated sheet package in the embodiment illustrated but can also be made of magnetically soft composite material. It can be seen in FIG. 1 that each of the two magnetically soft laminated sheet packages 6 comprises several teeth 7 arranged distributed in the circumferential direction. In the embodiment shown, a total of six teeth are provided for every laminated sheet package. Teeth 7 are at a uniform distance from each other in the circumferential direction and are connected to each other by way of yoke-like connecting sections 9. Connecting sections 9 are configured as ring segments and together with center parts of the teeth form a closed circular ring, from which an outer part 15 of the tooth projects radially outwardly, and an inner part 16 of the tooth projects radially inwardly at every tooth, respectively.

Each of the two stator assemblies further comprises a total of six coils 8. Coils 8 together form a stator winding which can be energized accordingly to generate a net force acting in the radial direction upon rotor 4 of the magnetic bearing. Coils 8 are shown only schematically in the illustrations and can completely fill the gap between the radially projecting parts of the teeth. They are preferably wound onto the connecting sections by use of a toroidal winding machine. With respect to the axis of the magnetic bearing, the axis of each coil extends in the circumferential direction or tangentially, respectively.

Disposed axially between the two magnetically soft laminated sheet packages 6 is a permanent magnet assembly 10 of stator 3. Permanent magnet assembly 10 consists of a total of six single block-shaped permanent magnets 11 which are magnetized in the axial direction with respect to axis 2 of the magnetic bearing. The 6 single magnets are arranged between teeth 7 of magnetically soft laminated sheet packages 6 such that single magnets 11 and teeth 7 are aligned with each other in the axial direction FIGS. 2 and 3 show that rotor 4 of magnetic bearing 1 according to the invention consists of an outer hollow cylindrical part 12 and an inner part 13. Outer hollow cylindrical part 12 is configured as a magnetically soft laminated sheet package in order to prevent eddy currents in the outer region of the rotor. Inner part 13 of the rotor is configured as a solid magnetically soft circuit yoke to axially conduct the magnetic flow generated in the stator.

It can be seen in the cross-sectional view according to FIG. 3 that teeth 7 of the magnetically soft laminated sheet packages and single magnets 11 arranged between the two laminated sheet packages have substantially the same cross-section. In order to keep the procurement costs for the single magnets low, they are configured as simple cuboid blocks. Teeth 7 of laminated sheet packages 6 differ from the single magnets in their shape only in that they nestle with their end facing the axis against the outer circumference of the rotor. Regardless of this, there is of course a certain air gap between teeth 7 and the outer circumference of the rotor.

Figure 4:
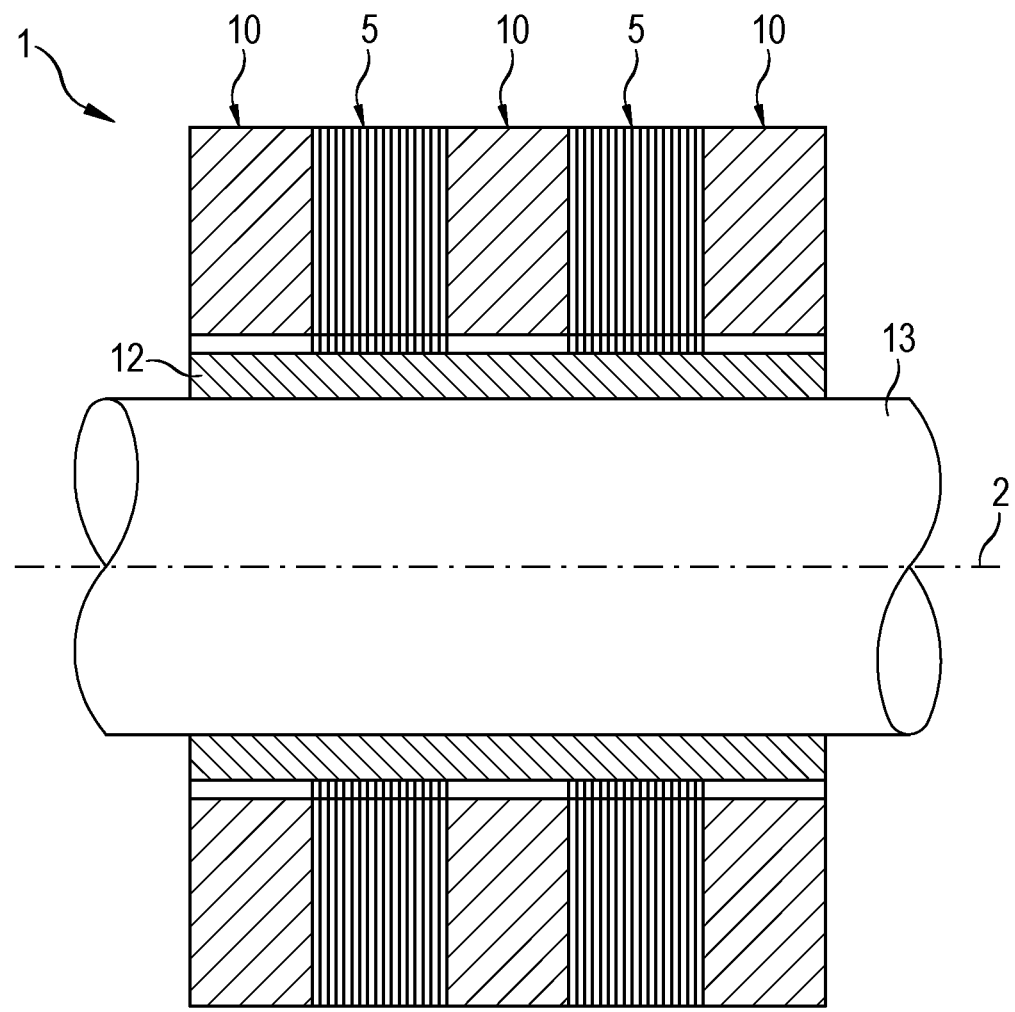

FIG. 4 shows a radial magnetic bearing 1 according to a further embodiment of the present invention. The illustration shows a longitudinal sectional view similar to FIG. 2. The structure in the center region of magnetic bearing 1 is basically the same as in the embodiment of FIGS. 1 to 3. The difference to the embodiment of FIGS. 1 to 3 is that two additional permanent magnet assemblies 10 are provided. The two additional permanent magnet assemblies 10 are located at the two axial ends of the magnetic bearing. The magnetic bearing at the two respective axial ends therefore terminates with a permanent magnet assembly. The rotor of the magnetic bearing must accordingly be configured to be longer. The magnetic flow is completed at the two axial ends of the magnetic bearing via the air. The embodiment shown in FIG. 4 by way of example represents a number of conceivable embodiments with an arbitrary number of stator assemblies. Because the two permanent magnet assemblies 10 can be adjoined by further stator assemblies.

Figure 5:
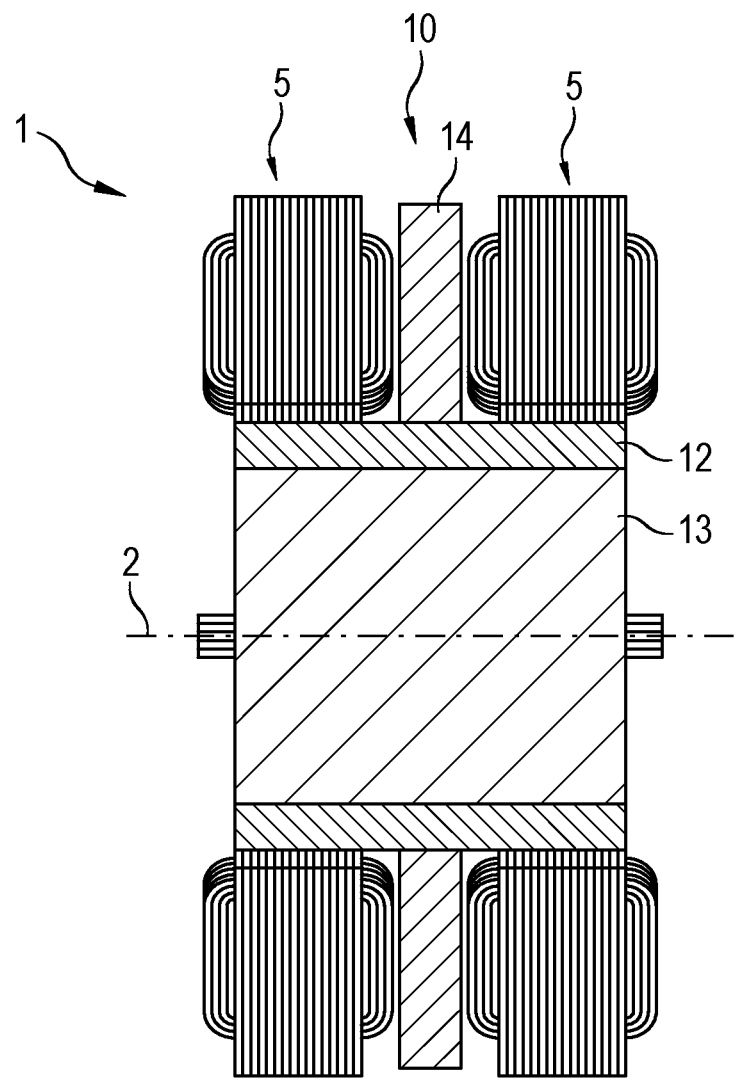

FIG. 5 shows a further embodiment of a radial magnetic bearing 1 according to the invention. The illustration again shows a longitudinal sectional view similar to FIGS. 2 and 4. In contrast to the embodiment from FIGS. 1 to 3, permanent magnet assembly 10 arranged between the two stator assemblies 5 is not part of the stator but part of the rotor. It consists of a single permanent magnet ring 14 which is firmly connected to the other components of the rotor. Permanent magnet ring 14 has a through-bore through which outer and inner parts 12, 13 of the rotor shaft extend.

Figure 6:
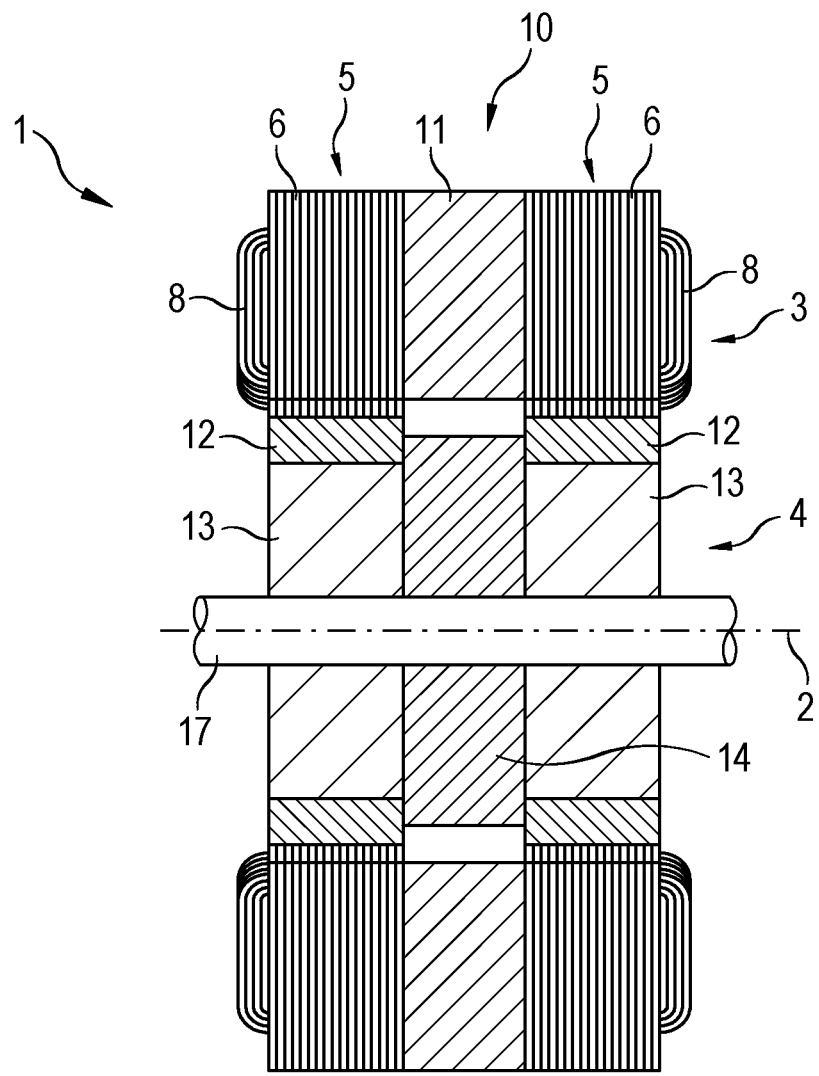

FIG. 6 shows a further embodiment of a radial magnetic bearing 1 according to the invention. In this embodiment, stator 3 is configured in the same way as in the embodiment of FIGS. 1 to 3. Inner part 13 and outer hollow cylindrical part 12 of rotor 4, however, are interrupted at the center by a permanent magnet ring 14 which is part of the rotor, similar to the embodiment of FIG. 5. Permanent magnet ring 14 is likewise axially magnetized and is located axially between two laminated sheet packages 6 of the stator, although the outer diameter of the permanent magnet ring is smaller than the inner diameter of hollow cylindrical laminated sheet packages 6. The outer diameter of permanent magnet ring 14 is at most equal to the outer diameter of the magnetically soft rotor parts. Disposed radially outside permanent magnet ring 14 are single magnets 11 on the stator side. The embodiment of FIG. 6 differs from the embodiment of FIGS. 1 to 3 additionally in that the rotor comprises a central shaft 17 which extends through a corresponding bore of inner part 13 of the rotor and of permanent magnet ring 14.

Figure 7:
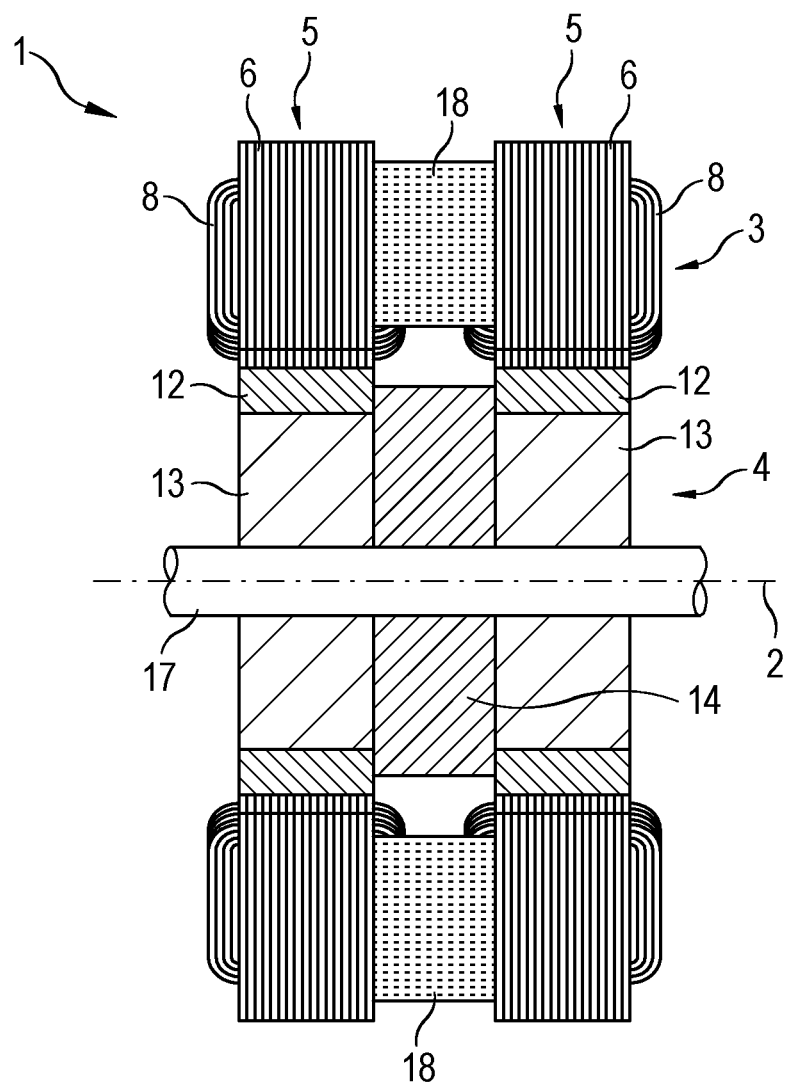

FIG. 7 shows a further embodiment of a radial magnetic bearing 1 according to the invention. This embodiment differs from the embodiment of FIG. 6 in that no single magnets are provided on the stator side. No permanent magnet assembly is therefore present on the stator side. The permanent magnet assembly there consists only of permanent magnet ring 14 on the rotor side. Single magnets 11 are replaced in this embodiment by magnetically soft blocks 18 which consist of stacked radially or tangentially extending magnetically soft plates or of magnetically soft composite material. Magnetically soft blocks 18 can be connected to magnetically soft cores 6 in a positive substance-fit manner. It is also possible to embody magnetically soft blocks 18 as part of at least one of magnetically soft cores 6.

The invention claimed is:
1. Radial magnetic bearing comprising:
   an axis, a stator; and
   a rotor,
   wherein said stator includes at least two stator assemblies axially spaced from one another, where each of said stator assemblies includes a magnetically soft core;
   wherein at least one of said stator assemblies includes one said magnetically soft core with several radially projecting teeth arranged distributed in a circumferential direction, and several coils likewise arranged distributed in the circumferential direction, and where two respective teeth of said magnetically soft core that are successive in a circumferential direction are connected to each other by way of a connecting section of said core;
   wherein a permanent magnet assembly is disposed axially between said two magnetically soft cores; and
   the at least one stator assembly being configured such that one of said respective connecting sections is wound with one of said respective coils, wherein said magnetic bearing at two respective axial ends terminates with a respective additional permanent magnet assembly.

2. Radial magnetic bearing comprising:
an axis, a stator; and
a rotor, wherein said stator includes at least two stator assemblies axially spaced from one another, where each of said stator assemblies includes a magnetically soft core;
wherein at least one of said stator assemblies includes one said magnetically soft core with several radially projecting teeth arranged distributed in a circumferential direction, and several coils likewise arranged distributed in the circumferential direction, and where two respective teeth of said magnetically soft core that are successive in a circumferential direction are connected to each other by way of a connecting section of said core;
wherein a permanent magnet assembly is disposed axially between said two magnetically soft cores; and
the at least one stator assembly being configured such that one of said respective connecting sections is wound with one of said respective coils, wherein said magnetic bearing comprises:
three stator assemblies, where either only the center one of said three stator assemblies or only the outer two of said three stator assemblies has a coil.

3. Radial magnetic bearing according to claim 2, wherein all of said stator assemblies are embodied such that their magnetically soft core comprises:
several radially projecting teeth arranged distributed in the circumferential direction, where two respective teeth of said magnetically soft core that are successive in the circumferential direction are connected to each other by way of a connecting section of said core, and where one respective connecting section is wound with one respective coil.

4. Radial magnetic bearing according to claim 2, wherein said rotor comprises:
an outer hollow cylindrical part and an inner part, where said outer hollow cylindrical part is embodied as a magnetically soft laminated sheet package, and where said inner part of said rotor is embodied as a solid magnetically soft circuit yoke.

5. Radial magnetic bearing according to claim 2, wherein said permanent magnet assembly comprises:
a continuous axially magnetized permanent magnet.

6. Radial magnetic bearing according to claim 5, wherein each of said magnetically soft cores comprises:
four or six teeth each.

7. Radial magnetic bearing according to claim 6, wherein a second permanent magnet assembly is respectively arranged between each additional two axially successive stator assemblies.

8. Radial magnetic bearing according to claim 2, wherein said magnetic bearing at two respective axial ends terminates with a respective additional permanent magnet assembly.

9. Radial magnetic bearing according to claim 8, wherein said connecting sections are each configured as a ring segment.

10. Radial magnetic bearing according to claim 8, wherein said connecting sections extend rectilinear and in a tangential direction.

11. Radial magnetic bearing according to claim 2, wherein said teeth project both radially outwardly as well as radially inwardly.

12. Radial magnetic bearing according to claim 2, wherein said permanent magnet assembly is configured with a rare earth magnet.

13. Radial magnetic bearing according to claim 12, wherein said magnetically soft core consists of:
a laminated sheet package or of magnetically soft composite material.

* * * * *